United States Patent
Shabtai et al.

(10) Patent No.: US 7,410,371 B2
(45) Date of Patent: Aug. 12, 2008

(54) COMPUTING DEVICE HAVING SOCKET AND ACCESSORY DEVICE CONTAINMENT

(75) Inventors: Avihai A. Shabtai, Peduel (IL); Nissim Cohen-Matzliah, Tel Aviv-Yaffo (IL); Youry Kirpichnikov, Rehovot (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/610,089

(22) Filed: Dec. 13, 2006

(65) Prior Publication Data
US 2007/0155203 A1   Jul. 5, 2007

(51) Int. Cl.
*H01R 13/44* (2006.01)
(52) U.S. Cl. .......................... 439/131; 439/31; 439/32; 439/640
(58) Field of Classification Search .............. 439/131, 439/638, 31, 32, 640
See application file for complete search history.

(56) References Cited

U.S. PATENT DOCUMENTS

| | | | |
|---|---|---|---|
| 5,411,405 A | 5/1995 | McDaniels et al. | |
| 5,995,468 A * | 11/1999 | Furukawa | ................ 720/607 |
| 6,099,329 A | 8/2000 | Goff et al. | |
| 6,273,735 B1 | 8/2001 | Johnson et al. | |
| 6,290,517 B1 | 9/2001 | Anderson | |
| 6,561,824 B1 | 5/2003 | Beckham et al. | |
| 6,676,420 B1 | 1/2004 | Liu et al. | |
| 2004/0109722 A1 | 6/2004 | Huang | |
| 2005/0282417 A1 | 12/2005 | Tsao | |

FOREIGN PATENT DOCUMENTS

EP   0697753 A1   12/1996

* cited by examiner

*Primary Examiner*—Renee S Luebke
*Assistant Examiner*—Vanessa Girardi

(57) ABSTRACT

A computing device (110) has a body comprising a mechanised socket (170). The socket (170) is retractable within a volume (150) enclosed by the body of the computing device (110). Activation of a mechanism causes the socket to extend (140) beyond said volume (150) into an extended position (270), allowing user-access to said socket (170). Advantageously, during normal active usage, the socket (170) is retracted within the volume enclosed by the body of the computing device (110).

10 Claims, 4 Drawing Sheets

COMPUTING DEVICE HAVING SOCKET AND ACCESSORY DEVICE CONTAINMENT

FIELD OF THE INVENTION

The present invention relates to a protective mechanism for use with a data interface socket in a computing device. The invention is applicable to, but not limited to use with sockets found in any type of laptop, industrial or automotive user computer.

BACKGROUND OF THE INVENTION

It is often necessary to add functionality to computing devices, either in software by downloading the required software application of data, or in hardware. The addition of hardware can mean adding an internal computer interface bus-enabled device, or an external device via a universal serial bus (USB)™/Firewire™ socket. This is a relatively simple exercise in a desk-top computer where, the environment is benign. However, industrial and portable computing devices often must operate in harsh environments. This creates a requirement for greater mechanical ruggedness, whilst maintaining substantially the same functionality.

Such computing devices may, in extreme cases, have to dispense with external interface sockets, e.g. serial interfaces/ports such as Ethernet or USB, which significantly reduces their usability.

In other cases, it may be impractical or impossible to utilise the serial interface whilst the computing device is in operation, due to legal restrictions involving safety functions. Such is the case, for example, with vehicle cab display computers in public service vehicles. This is due to the possibility that the serial interface device may interfere mechanically with other safety functions, such as the air bag. In such cases, the extra functionality provided by the serial interface, such as the option for reading a driver identification device via the serial port, are simply unusable.

Thus, a need exists for a mechanically robust mechanism that allows the use of the serial port sockets of mobile, industrial and/or vehicle-cab computing devices whilst alleviating the problems associated with existing solutions.

STATEMENT OF INVENTION

In accordance with a first aspect of the present invention, there is provided a device, as claimed in Claim 1.

Further aspects and advantageous features of the present invention are as described in the appended Claims.

An innovative computing device is described having a mechanised serial communications interface socket, which is operably connected to the computing device. Advantageously, the mechanised socket provides a means of adjusting the position of the socket, for example a socket that accepts a serial interface for the computing device, such that it remains accessible for a wide range of physical mounting positions and environments required of, and experienced by, the computing device.

The mechanised socket of the computing device is, during normal active usage, preferably fully retracted within a volume enclosed by the body of the computing device. Activation of a mechanism associated with the socket causes the socket to extend beyond the volume enclosed by the body of the device, and into an extended position. This allows user-access to the socket. Thus, and advantageously, the socket is mechanically protected by the housing of the computing device, and is only exposed for user access for a short period, while remaining fully operable at all times.

In a further advantageous embodiment, the socket is a general serial communications interface socket, or specifically a USB™ socket. This allows the functionality of standard serial devices to be added to the computing device and, in particular, the specific and significantly extended "plug and play" functionality supported by USB™.

In a yet further advantageous embodiment, the socket is mechanically located to the computing device via a pivot, which is a simple, low cost and robust mechanism. Rotation of the socket around the pivot causes the socket to either extend beyond the volume enclosed by the body of the device, or retract within the volume, thus providing the required socket mobility.

In a still yet further advantageous embodiment, the mechanism includes a semi-automatic opening function, such that when the socket is in the retracted position, activation of the mechanism causes the socket to rotate around the pivot by at least a pre-defined minimum angle. Thus, the user does not have to try and remove the socket from within the body of the computing device, as this function is performed semi-automatically.

In a further advantageous embodiment, the user may set the final "extended" position of the socket. This allows the user to fix the extended position according to the actual usage of the device.

Advantageously, in a still further embodiment, the socket is mechanically located to the computing device via a sliding mechanism. Motion of the socket along the sliding mechanism causes the socket to either extend beyond the volume enclosed by the body of the device, or retract within the volume. In this still further embodiment, the socket occupies a minimum area on the surface of the computing device.

In an enhancement of this embodiment, the sliding mechanism includes semi-automatic opening function such that, when the socket is in the retracted position, activation of the mechanism causes the socket to slide at least a pre-defined minimum distance along the mechanism. Thus, the user can easily extend the socket for use. Furthermore, the user can also, and advantageously, set the "extended" position of the socket.

The socket mechanism includes a positive locking means for locking the socket in the retracted and/or the extended position. Thus and advantageously, the user may lock the socket so as to prevent unwanted, and potentially damaging, motion of the socket.

Advantageously, the socket is mechanically located to the computing device via a combination sliding and pivoting mechanism. Motion of the socket along the sliding mechanism causes the socket to either extend beyond the volume enclosed by the body of the device, or retract within the volume. Subsequent rotation of the socket around the pivot then allows the angle of the socket to be adjusted with respect to the computing device. Thus, the socket may be extended beyond the device by a required distance and then rotated to enhance access to the socket.

The retractable mechanised socket allows the computing device to meet safety regulations relating to a maximum footprint of the device.

In this manner, the aforementioned problems associated with adding functionality to a computing device via standard data interface sockets, either in software or hardware or via an external interface such as a USB socket/port, whilst simultaneously providing mechanical security and alleviating the problems associated with the prior-art, are substantially resolved.

This has been achieved by the provision of a mechanised socket, capable of being moved from a position within the body of the computing device to which it is mounted, to a position external to the body of the device, the socket remaining functional at all times. Advantageously, a further recess is provided within the body of the computing device to accommodate a further device plugged into the socket.

The teachings of the current invention are applicable to any type of computing device incorporating one or more serial data interfaces or any device that would benefit form an ability to extend and retract an interface socket as described herein.

BRIEF DESCRIPTION OF THE DRAWINGS

Exemplary embodiments of the present invention will now be described, by way of example only, with reference to the accompanying drawings, in which.

DESCRIPTION OF PREFERRED EMBODIMENTS

The preferred embodiment of the present invention will be described in terms of a vehicle cabin display computer. The description of the interface socket will be limited to a "pivoting" socket mounting, however, it will be appreciated that the inventive concept may be embodied in any portable or industrial computing device that could benefit from increased mechanical protection for serial data interfaces, and any further type of mechanical mounting that provides the required functionality, such as a sliding or screw-type mechanism.

Figure 1:
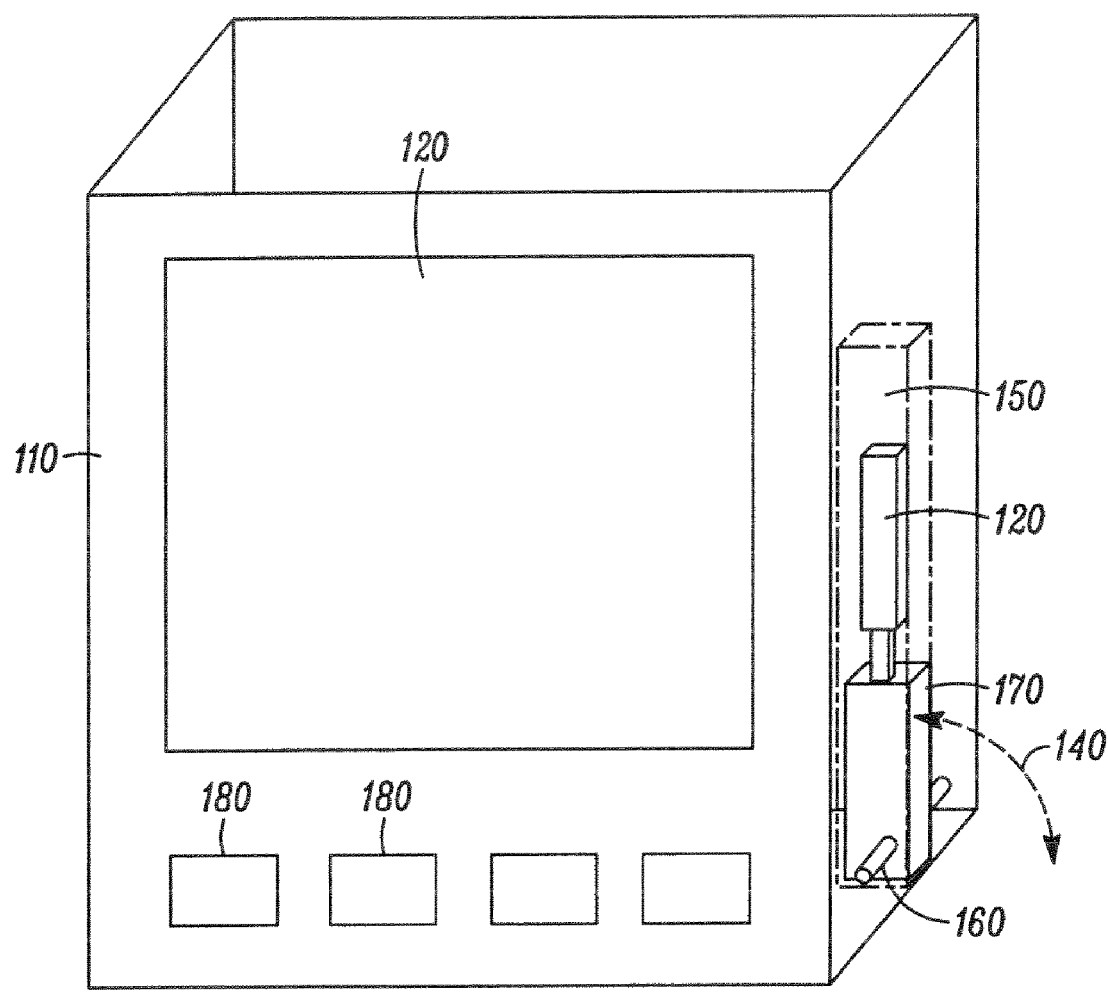
FIG. 1 illustrates a computing device adapted in accordance with the present invention showing the mechanised socket in the retracted position.

FIG. 1 shows a computing device 110 with display 120, function keys 180, and one or more serial interface sockets 170. The serial interface 170 may be an RS232/RS485 type interface, or a USB™, Firewire™ or Ethernet™ interface. This description is based on a USB™ interface. However, it is envisaged that the inventive concept applies equally to any serial interface.

The device 110 is shown with a single serial socket 170, limited only by the physical size of the device 110 and that of the sockets 170. However, it is envisaged that multiple sockets are also possible. Due to legal requirements, the physical dimensions of vehicle cab computing and display devices must be strictly defined and limited. The insertion of a further device 220, such as a disk-on-key, into a serial port 170 of the computing device 110, would thus significantly change the footprint of the computing device. Consequently, this could interfere with other mechanical functions such as an airbag. This limits the use of devices that are connected to the computing device 110, particularly for extended periods, such as security devices used for authentication purposes and/or memory devices.

FIG. 1 illustrates a computing device 110 incorporating a serial data interface socket 170 according to the embodiments of the current invention. The socket 170 is mechanised, i.e. it is mechanically mounted to the device 110 via a linkage 160 that both fixes it to the computing device in a mechanically stable and robust manner, and also allows the socket to move. The degree of motion allowed is substantial, i.e. the motion is not simply the "play" found normally in mechanical mountings. The mechanised socket may, as and when required, be moved by the user to a more accessible position relative to the computing device housing. In FIG. 1, the socket 170 is illustrated in the retracted position, i.e. within the housing of the computing device.

The socket 170 is mounted to the device 110 on a pivot mechanism 160, and sits in a recess or cut-out 150 within a volume defined by the body of the device 110.

The volume of the recess 150 and the magnitude of its longest dimension are limited only by the physical dimensions of the device 110. These dimensions are not specified, but should be chosen so as to be large enough to accommodate any further device 150, which may be realistically expected to be plugged into the socket 170.

Figure 2:
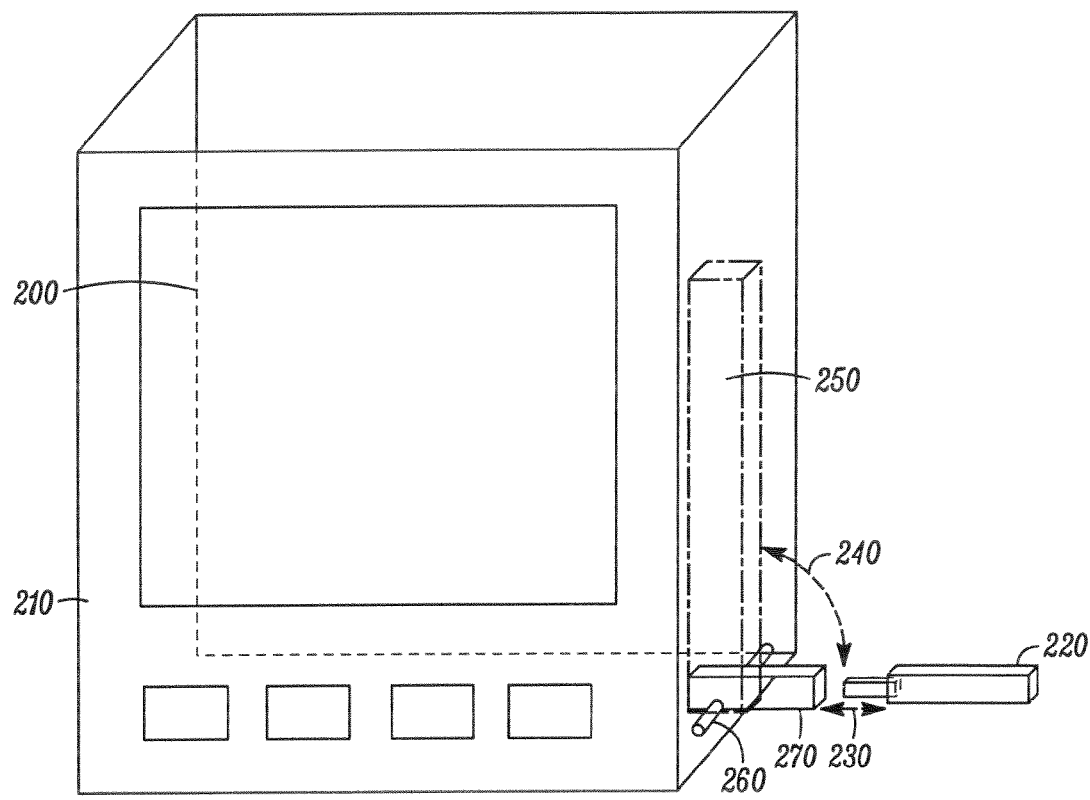
FIG. 2 illustrates a computing device adapted in accordance with the present invention, showing the mechanised socket in the extended position.

The pivot 160 is mounted to the device 110 such that motion 140 of the socket 170 around the pivot 160, causes the socket 170 to rotate out of the recess 150 and into the extended position 220, as shown in FIG. 2.

Referring now to FIG. 2, and once in this extended position 270, the user is able to engage a locking mechanism in order to hold the socket 170 firmly in place. A further accessory device 220 can now be pushed into the socket 170, thus adding the functionality provided by this accessory device 220 to the computing device 110.

It is not envisaged that the socket 170 is fully extended/rotated in order for the further accessory device 220 to be inserted. A preferred embodiment of the present invention provides for a locking mechanism that is capable of holding the socket at any random, user-selected position, with respect to the body of the computing device.

Once the further accessory device 220 has been inserted into the socket 170, 270 the socket can be preferably rotated 240 back into the recess 250. Both the socket 170, 270 and the further accessory device 220 are now accommodated within the recess 150, 250, which is itself located within the volume enclosed by the body of the device 110.

In this position the socket 170, 270 and the accessory device 220 are protected from mechanical damage, caused for example by impact with some external object, by the body of the computing device 110. Furthermore, the footprint of the computing device remains unchanged.

It is envisaged that the further accessory device 220 may be any of a wide range of devices, such as a security device, a so called "dongle", for example used for validation or identification purposes, or a memory stick (Disk-on-key), or bluetooth (BT™) enabled communication device 120. In each of these cases the accessory device 120, 220 has relatively well defined, standardised dimensions. Thus, the cut-out 150, 250 can be designed accordingly.

Figure 3:
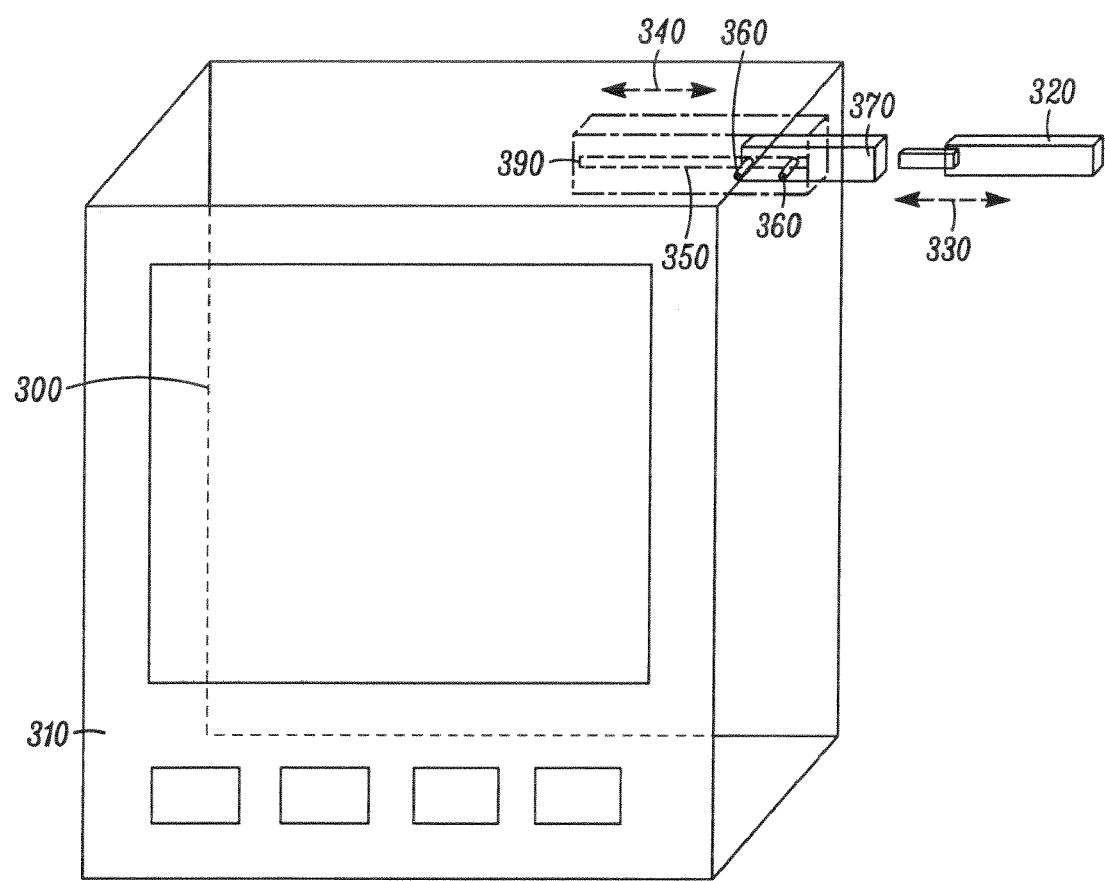
FIG. 3 illustrates a computing device adapted in accordance with the present invention, showing the mechanised socket in the extended position.

In cases where the pivoting or rotational motion 140 illustrated in FIG. 1 is impractical or physically impossible, it is envisaged that a sliding mechanism 340 illustrated in FIG. 3 may replace the pivot 160. In this case, the socket 370 in FIG. 3 sits in a recess 350 within the body of the device 310. The volume of the recess 350 is preferably defined by a mechanical metal or rugged plastic housing. The recess housing is provided with sliding mechanism that may be a simple slot or slots provided in the housing, into which runners 360 attached to the socket are located. The length of the slot(s) need(s) to be substantially the same length or somewhat longer than the socket itself. A person skilled in the art could easily conceive of other more complex or less complex sliding mechanisms.

Figure 4:
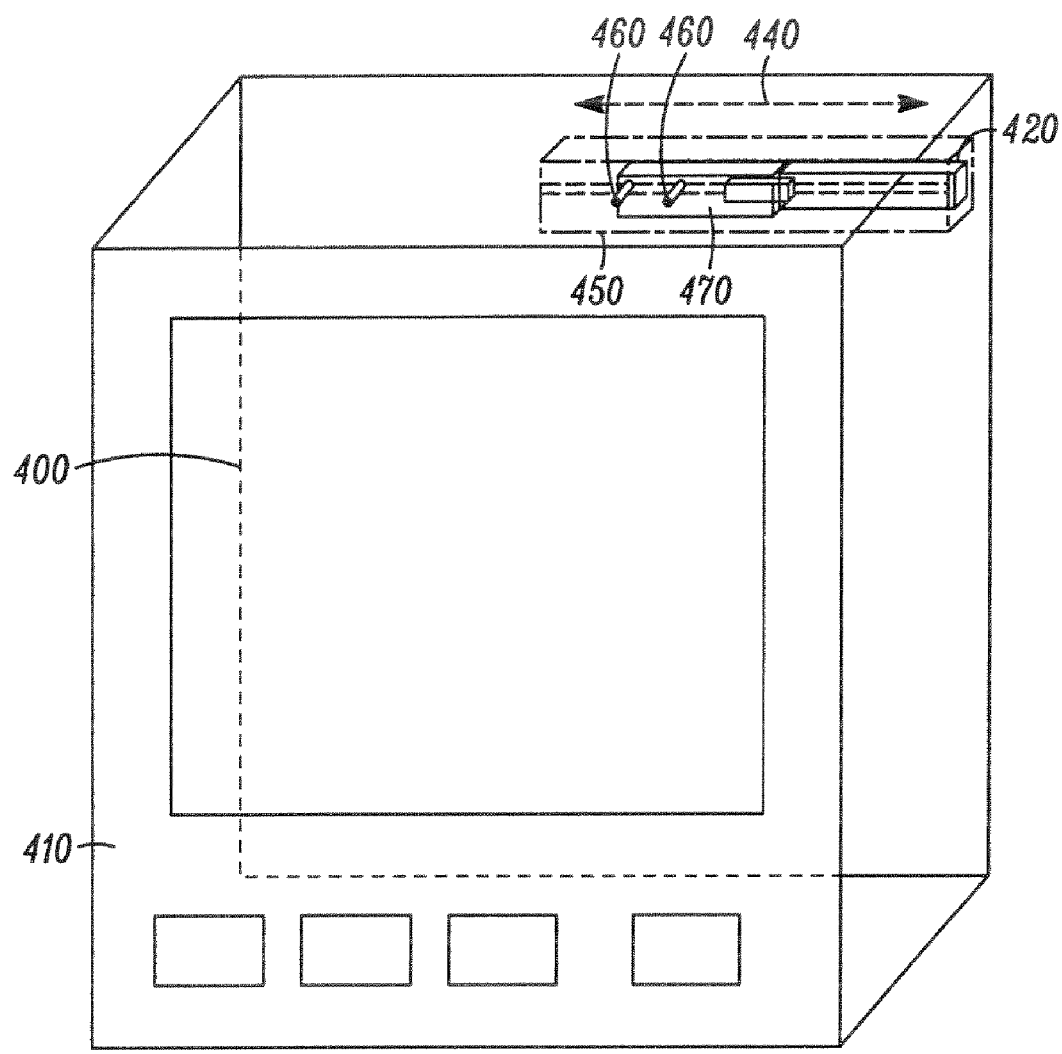
FIG. 4 illustrates a computing device adapted in accordance with the present invention showing the mechanised socket in the retracted position.

As illustrated in FIG. 3 and FIG. 4, the socket 370 is mounted to the device via a sliding mechanism comprising two slots 390 (only one slot is visible, the other being behind the socket as illustrated) and one or more mechanical sliders 360. When in the retracted position, as illustrated in FIG. 4, the socket 470 is able to move in a substantially linear fashion 440 into the extended position illustrated in FIG. 3, thus allowing the further accessory device 320 to be inserted.

The socket 370 and further accessory device 320 would then be pushed back into the recess 350, which is itself within the volume enclosed by the body of the device 110. This "retracted" state is illustrated in FIG. 4, with both the socket 470 and the further accessory device 420 completely enclosed within the recess 450, which is itself within the volume enclosed by the body of the device 110.

In this configuration, i.e. locked in a position such that it appears as a "standard" non-mechanised socket with a standard orientation with respect to the body of the computing device 110, the socket 370 would appear to be a normal socket, and could be used as such without extending or retracting.

In both the rotational and linear motion cases, it is envisaged that a semi-automatic opening mechanism may be employed in order to simplify the task of extending the socket 170, 470. It is envisaged that such a mechanism could include a mechanical energy storage device, such as a spring, that is mechanically fixed to both the socket 170, 470 and the computing device 110. In this retracted position 170, 470, the spring is compressed. In this position the socket is then preferably held in place by a latch or some other suitable mechanism.

When the user releases the latch, the energy stored in the spring causes the socket 170, 370 to move into the extended position 270, 470. The action of re-positioning the socket 270, 370 back into the recess 250, 450 causes the spring to be once again compressed ready for the next operational cycle.

It us within the contemplation of the present invention that other mechanisms may also be used for the purpose of providing a mechanical storage functions, such as electromagnetic actuators, for example.

In order to provide maximum flexibility, both the linear (sliding) 440 and pivoting 140 mechanisms can be employed simultaneously. This combination mechanism could advantageously be used in applications where access to the serial interface sockets 170 of a device 110 is particularly restricted, and the combination of a linear motion combined with a pivoting motion is required. Clearly, such a mechanically actuated or "mechanised" socket 170, 370, that can be revealed for use and then hidden, may be located anywhere on the body of the computing device 110. It may even be located, for example, below or above the display 120, because any further accessory device 120, inserted into the socket 170, 370 is also hidden once retracted, thus maintaining the form factor of the device 110.

Whilst specific implementations of the present invention have been described, it is clear that one skilled in the art could readily apply further variations and modifications of such implementations within the scope of the accompanying claims.

Thus, a computing device with a mechanised socket for use therewith has been described, where the aforementioned disadvantages with prior art arrangements have been substantially alleviated.

The invention claimed is:

1. A computing device having a body comprising:
   a mechanized socket, wherein the mechanized socket is retractable within a recess enclosed by the body of the computing device; and
   a mechanism coupled to the mechanized socket, activation of the mechanism enabling a semi-automatic opening function that causes the mechanized socket to extend beyond said recess into an extended position, allowing insertion and activation of an accessory device, such that the mechanized socket is capable of normal active use both in an extended position beyond the recess as well as when both the mechanized socket and active accessory device are moved back into said recess.

2. The computing device according to claim 1 wherein the mechanized socket is a serial communications interface socket.

3. The computing device according to claim 2 wherein the mechanized socket is a Universal Serial Bus (USB) socket.

4. The computing device according to claim 1 wherein the mechanized socket is mechanically connected to said computing device via a sliding/pivoting mechanism, motion of the mechanized socket along the sliding mechanism causing the socket to either extend beyond the volume enclosed by the body of the device, or retract within the volume, whereby subsequent rotation of the mechanized socket around the pivot allows an angle of the mechanized socket to be adjusted with respect to the computing device.

5. The computing device according to claim 1 wherein the mechanized socket is mechanically connected via a pivot to said computing device, whereby rotation of the mechanized socket around the pivot causes the mechanized socket to either extend beyond the recess enclosed by the body of the device, or retract within the recess.

6. The computing device according to claim 5 wherein the activation of the mechanism causes the mechanized socket to rotate around the pivot by at least a pre-defined minimum angle.

7. The computing device according to claim 6 wherein the extended position of the mechanized socket is user-definable.

8. The computing device according to claim 1 wherein the mechanized socket is mechanically connected to said computing device via a sliding mechanism, whereby motion of the mechanized socket along the sliding mechanism causes the socket to either extend beyond a volume enclosed by the body of the device, or retract within the volume.

9. The computing device according to claim 8 wherein the activation of the mechanism causes the mechanized socket to slide at least pre-defined minimum distance along the sliding mechanism.

10. The computing device according to claim 9 wherein the extended position of the mechanized socket is user-definable.

* * * * *